(12) United States Patent
Hopf et al.

(10) Patent No.: US 12,536,509 B2
(45) Date of Patent: Jan. 27, 2026

(54) VEHICLE DAMAGE EVALUATION AND DOCUMENTATION SYSTEM

(71) Applicants: Steven Hopf, Boerne, TX (US); Kevin Gene Abelbeck, Alcoa, TN (US)

(72) Inventors: Steven Hopf, Boerne, TX (US); Kevin Gene Abelbeck, Alcoa, TN (US)

( * ) Notice: Subject to any disclaimer, the term of this patent is extended or adjusted under 35 U.S.C. 154(b) by 0 days.

(21) Appl. No.: 18/418,235

(22) Filed: Jan. 20, 2024

(65) Prior Publication Data
US 2025/0238765 A1 Jul. 24, 2025

(51) Int. Cl.
G06Q 10/20 (2023.01)
G06T 3/40 (2024.01)
G06T 7/00 (2017.01)

(52) U.S. Cl.
CPC ............ *G06Q 10/20* (2013.01); *G06T 3/40* (2013.01); *G06T 7/0004* (2013.01); *G06T 2207/20101* (2013.01); *G06T 2207/30252* (2013.01)

(58) Field of Classification Search
CPC .... G06Q 10/20; G06Q 40/08; G06Q 30/0611; G06Q 10/06395; G06Q 10/0875; G06Q 30/0205; G06Q 30/0206; G06Q 50/16; G06Q 50/26; G06Q 50/08
See application file for complete search history.

(56) References Cited

U.S. PATENT DOCUMENTS

| 6,052,631 | A  | 4/2000  | Busch et al.    |
|-----------|----|---------|-----------------|
| 6,219,930 | B1 | 4/2001  | Reid            |
| 6,397,131 | B1 | 5/2002  | Busch et al.    |
| 6,470,303 | B2 | 10/2002 | Kidd et al.     |
| 6,885,981 | B2 | 4/2005  | Bomar, Jr. et al. |
| 7,331,133 | B2 | 2/2008  | Bauernfeind     |
| 9,189,960 | B2 | 11/2015 | Couch et al.    |
| 9,424,606 | B2 | 8/2016  | Wilson, II et al. |
| 9,990,662 | B2 | 6/2018  | Couch et al.    |

(Continued)

FOREIGN PATENT DOCUMENTS

| CN | 119486844 A | * | 2/2025 | ............. B05D 5/005 |
| WO | WO-2025027539 A1 | * | 2/2025 | ............. G06T 7/0004 |

OTHER PUBLICATIONS

J. J. Elavarasi, A. Franklin and S. Nagarajan, "Sensor and Microcontroller based 360 Degree Car Assistance System," 2023 4th International Conference on Electronics and Sustainable Communication Systems (ICESC), Coimbatore, India, 2023, pp. 145-150, doi: 10.1109/ICESC57686.2023.10193445. (Year: 2023).*

(Continued)

*Primary Examiner* — Maria C Santos-Diaz

(57) ABSTRACT

The present invention may include a software application used on a smartphone or other electronic device utilizing a camera and a processor. The software application may include the ability to identify a dent in a vehicle body, documenting the extent of the damage of that dent, and maintain photographic and analytical data of that specific dent throughout a repair process. The software application may also guide a user as to the status of the repair process, providing a quantitative value of the repair and instructing the user when the level of repair of that dent is acceptable. Each of a potential plurality of dents on the vehicle body may be individually documented and evaluated providing a report that may be uploaded to existing body shop software or sent directly to the vehicle owner or an insurance provider.

10 Claims, 5 Drawing Sheets

(56) References Cited

U.S. PATENT DOCUMENTS

| | | | |
|---|---|---|---|
| 10,681,261 B2 | 6/2020 | Hauk | |
| 11,130,477 B2 | 9/2021 | Watts et al. | |
| 11,144,889 B2* | 10/2021 | Li | G06T 7/001 |
| 11,270,350 B2 | 3/2022 | Hauk | |
| 11,756,110 B2 | 9/2023 | Hauk | |
| 11,790,326 B2 | 10/2023 | Watts et al. | |
| 12,299,811 B2* | 5/2025 | Leise | G06V 10/82 |
| 2012/0297337 A1 | 11/2012 | St. Denis et al. | |
| 2013/0103449 A1 | 4/2013 | McGinn et al. | |
| 2016/0019616 A1 | 1/2016 | Couch et al. | |
| 2017/0352104 A1 | 12/2017 | Hanson et al. | |
| 2018/0260793 A1* | 9/2018 | Li | G06Q 40/08 |
| 2021/0081698 A1 | 3/2021 | Lindeman et al. | |
| 2022/0028045 A1* | 1/2022 | Forkuo | G06T 7/001 |
| 2022/0114561 A1 | 4/2022 | Watts et al. | |
| 2022/0164866 A1 | 5/2022 | Hauk | |
| 2023/0072718 A1 | 3/2023 | Bond et al. | |
| 2023/0073188 A1 | 3/2023 | Hanson et al. | |
| 2023/0162243 A1 | 5/2023 | Southin | |
| 2023/0342839 A1 | 10/2023 | Hauk | |
| 2025/0005675 A1* | 1/2025 | Giarrizzo, Jr. | G06Q 10/20 |

OTHER PUBLICATIONS

N. Fernando, A. Kumarage, V. Thiyaganathan, R. Hillary and L. Abeywardhana, "Automated vehicle insurance claims processing using computer vision, natural language processing," 2022 22nd International Conference on Advances in ICT for Emerging Regions (ICTer), Colombo, Sri Lanka, 2022 (Year: 2022).*

W. A. R. Harshani and K. Vidanage, "Image processing based severity and cost prediction of damages in the vehicle body: A computational intelligence approach," 2017 National Information Technology Conference (NITC), Colombo, Sri Lanka, 2017 (Year: 2017).*

Sumit Singh, Accelerate Car Damage Annotation With Labellerr's Auto Labeling Using SAM, Apr. 11, 2024, LABELLERR, https://www.labellerr.com/blog/accelerate-car-damage-annotation-with-labellerr-auto-labeling (Year: 2024).*

* cited by examiner

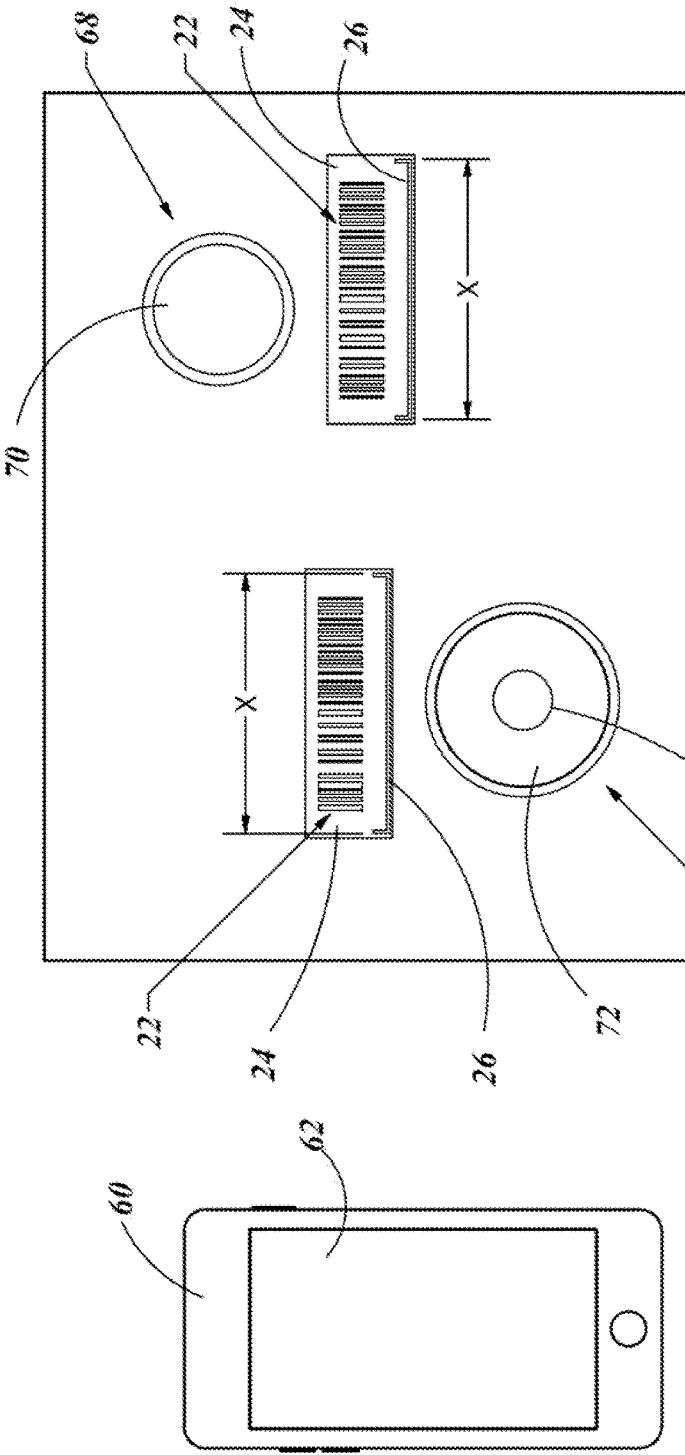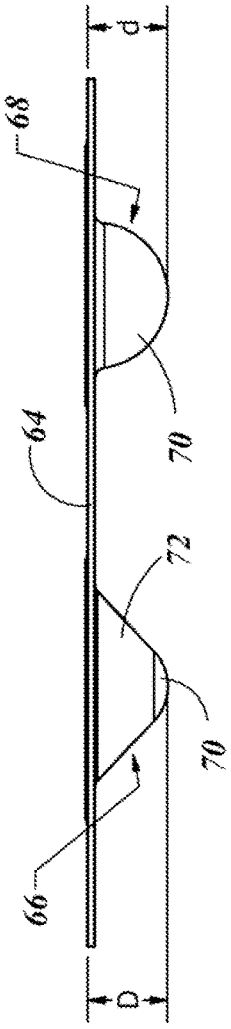
Fig. 3
Fig. 4
Fig. 2

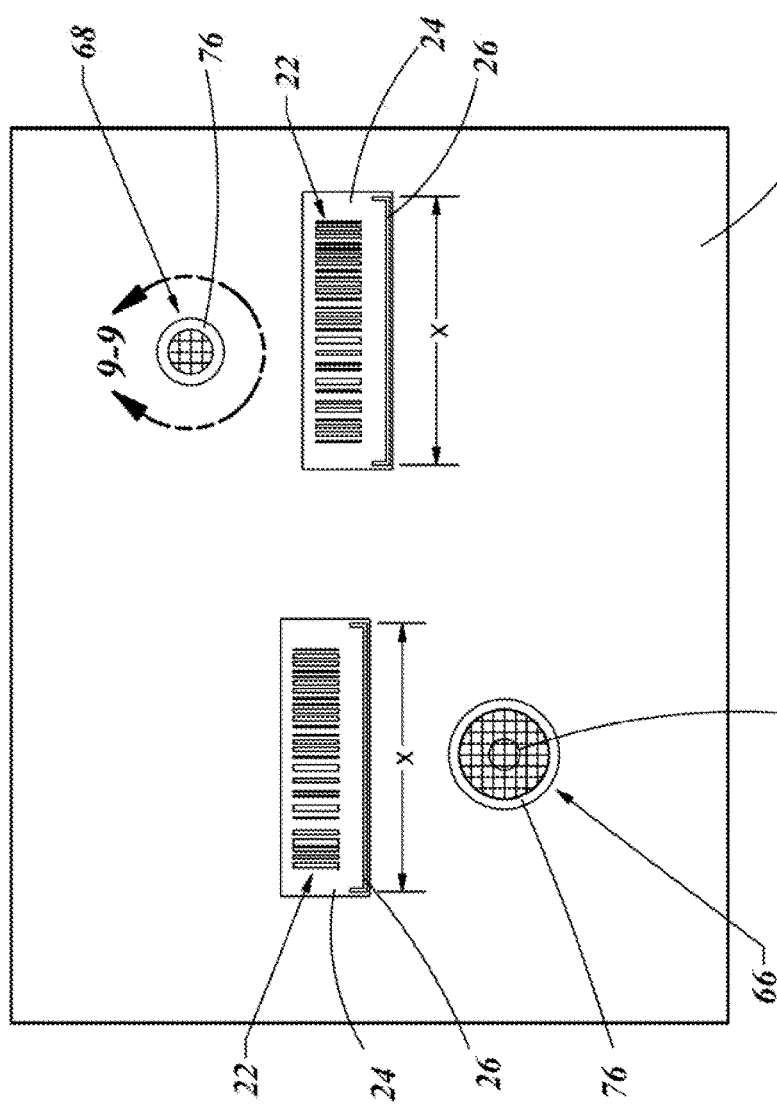
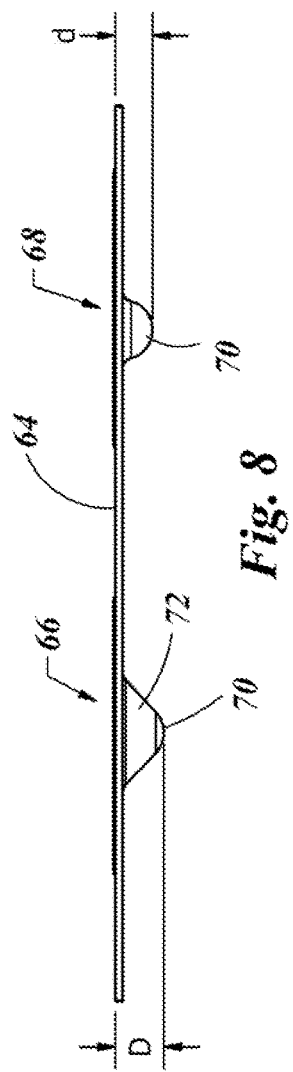
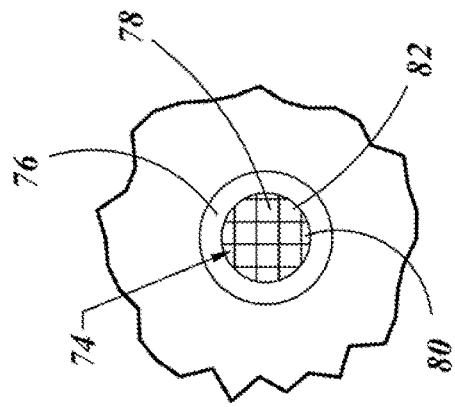

VEHICLE DAMAGE EVALUATION AND DOCUMENTATION SYSTEM

FIELD OF THE INVENTION

The present invention generally relates to electronic applications and more specifically to applications which utilize a camera and digitize an image from the camera and evaluate and document details of that photo.

BACKGROUND OF THE INVENTION

Phone applications or "apps" have become almost common place in today's world. So much so that the term "there's an app for that" is one of many common mores as people become more reliant on their handheld electronic devices. Though many apps are purely for mindless entertainment, some have practical applications that increase productivity and work quality. The subject of this patent application falls under this latter classification.

Automobile body dent repair is a thriving and necessary part of general vehicle repair. Dent repair comprises replacement of sections of an automobile body as well as the repair of existing portions of the vehicle body. Repairing is less costly and it is less evasive to the structure of the vehicle. When a part is replaced, such as a quarter panel, this portion of the vehicle must be physically removed, many times by using a saw or torch. The new part is then welded in place of the void created by the removal of the damaged part. Everything must then sanded and prepared so it can be painted to match the color of the rest of the vehicle body. In the factory, the painting process is done on the body alone, without the interior, engine, transmission and other parts. This allows the frame to be dipped or sprayed and then baked to cure the paint creating a very durable paint on the vehicle body. The options are much fewer when the vehicle is otherwise fully assembled. So, not only is replacement many times more expensive than repair, as it involves new parts and more processes, but it may result in a less durable final product, as it has been altered from the original factory assembly.

By contrast, the repair process allows skilled technicians to manipulate the existing factory parts to remove the imperfections, therefore bringing these damaged parts back to look undamaged. Sometimes this can be done even without harming the paint, thus removing the need for any repainting. When the damage to the part has damaged the paint, many times the part can be repaired, and then the area will be repainted. Regardless, this repair process utilizes the original vehicle parts, so no cutting torch or welder is used that may unintentionally alter the frame of the vehicle. Add to that the reduced cost usually associated with repair versus replace, and repairing is commonly preferred over replacement.

A potential shortcoming of the repair process involves quantifying the repair process. With replacement, the new part should be as good as the original part, or it would not be used. The repair process may involve hours of skilled workmanship to "work" the dent or other damage out of the vehicle body. So, if the time required to completely remove a dent so that it is exactly as if it was a new part is eight hours of work, it may take only two hours to get that part to 80% of that "perfect" part. It may be that 80% or 90% is all that is needed as the customer may never be able to see the difference between a 80% repaired part and a 100% repaired part. The vehicle body's function is likely purely aesthetic. With a mechanical component it is usually not acceptable to repair it part way. For example, repairing a transmission to only 80% repaired, as it is a mechanical system, will likely result in a problem in a few miles of use. Therefore, if an 80% repair of a vehicle body is undetectable versus a 100% repair, but the time required to make the 80% repair is substantially less than needed to get it to 100%, the cost savings to the vehicle owner may be substantial, to the customer's advantage.

This raises the next logical question of how do you determine the acceptable level of repair and consistently quantify that level of repair. It goes without saying that you cannot have an acceptable level of repair unless you can quantify the level of repair. Sophisticated scanners can be used to generate a three-dimensional mapping of the vehicle body and compare that to a baseline value to determine the amount of damage. The problem is these scanners, and the processing power needed to analyze the data, may be unrealistically expensive for a typical dent repair shop. By contrast, virtually every dent repair technician already owns a tool that has the capability to create an image and the processing power to analyze the image to extract enough data to assign a numerical value to a dent. That tool is a smart phone or tablet. An application on that phone or tablet may be used to enable a user to accurately measure the current level of dent damage and therefore provide a real time level of repair.

It should, therefore, be appreciated that there is a need for a method of measuring a vehicle body dent by way of a scaled photograph and digital analysis of that photograph. This method may also include a means of documenting the area of a closed polygon and comparison to a later photograph, thus providing a degree of repair for each identified dent. The present invention fulfills this need and others.

SUMMARY OF THE INVENTION

The present invention may include a vehicle damage evaluation system, which may provide an electronic device, which includes a camera and a processor. The electronic device may also include a software application for operating on the processor and incorporating an image provided by the camera. The software application may include the steps of prompting a user to input descriptive information about a project and prompting the user to input an acceptable repair goal somewhere between 10% and 99%. The next step may include prompting the user to mark the outside edge of a damaged area in a vehicle body, thereby creating a closed polygon of the damaged area.

The software application may then prompt the user to place a unique barcode decal with a scaling line adjacent to the marked damaged area on the vehicle body. The software may then open the camera feature on the electronic device and prompt the user to take an image of the damaged area, including the barcode decal. The software may then create a file unique to the barcode of the barcode decal, scale the image based on the scaling line on the barcode decal, lay an electronic scaled grid over the damaged area as defined by the closed polygon. The software may then quantify the area of the closed polygon using the electronic scaled grid.

The vehicle damage evaluation system as presented, wherein the initial value of the closed polygon may be identified as the initial area ($A_O$) and every subsequent value of the closed polygon may be identified as the current area ($A_N$). The current repair value ($R_C$) may be expressed as the one minus the ratio of the current area value divided by the initial area value multiplied by one hundred, or expressed mathematically as: $R_C=1-(A_N/A_O)*100$. The system may also include comparing the current repair value ($R_C$) to the acceptable repair goal ($R_G$). If the current repair value ($R_C$) is greater than or equal to the acceptable repair goal ($R_G$), the software application prompts the user that the repair is complete. If the current repair value ($R_C$) is less than the acceptable repair goal ($R_G$), the software application prompts the user to continue the dent repair process.

The vehicle damage evaluation system as presented, wherein the scaling line on the barcode decal may be consistent in length for each barcode decal, thus providing a baseline scale for each image to enable consistent scaling of each image. The barcode on each barcode decal may be unique, thereby enabling the software application to consistently identify each specific dent as the damaged area changes through a repair process.

The vehicle damage evaluation system step of quantify the area of the closed polygon, may include the step of counting all complete grid squares that fall within, and as defined by, the electronic scaled grid over the damaged area as defined by the closed polygon. All partial grid squares, in which only a portion of that grid square lies within the closed polygon, may be counted as a full grid square if 50% or more of the full grid square lies within the closed polygon. If the portion if the grid square that lies within the closed polygon is less than 50% of a full grid square, that grid square may not be counted. The areas of a grid square and a partial grid square may be determined by counting pixels in the images. In addition, the system may count all pixels that have been scaled, by way of the scaled line, without the use of a separate scaled grid, to provide the initial area ($A_0$) and the current area ($A_N$) values.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 1b is a second portion of the flow chart presented in FIG. 1a.

FIG. 2 is an example of an electronic device that may be used with the present invention.

FIG. 3 is a plan view of a section of a vehicle body with two dents, each with a unique scaling code decal adjacent to each dent.

FIG. 4 is a front view of the section of a vehicle body of FIG. 3 showing the depth and shape of each dent.

FIG. 7 is an example of an image of a portion of the vehicle body as presented in FIG. 5, now with the dents partially repaired.

FIG. 8 is a front view of the section of the vehicle body as presented in FIG. 7.

FIG. 9 is a detail view of one of the dents of FIG. 7, the detail noted by line 9-9, the detail more clearly illustrating the new grid pattern of the now smaller dent.

DETAILED DESCRIPTION OF THE INVENTION

Figure 1A:
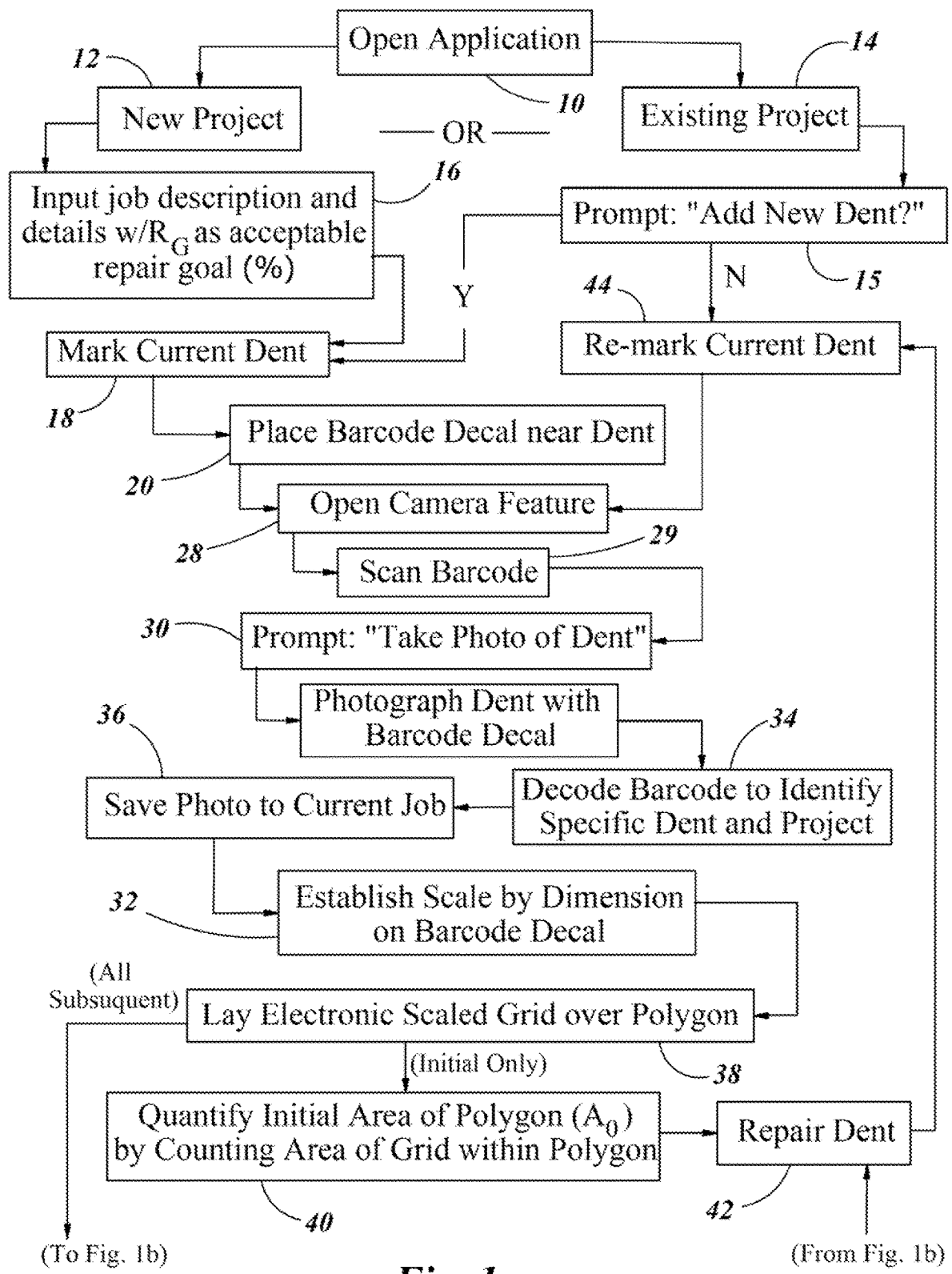
FIG. 1a is a first portion of a flow chard detailing the method of the invention as presented.
Figure 1B:
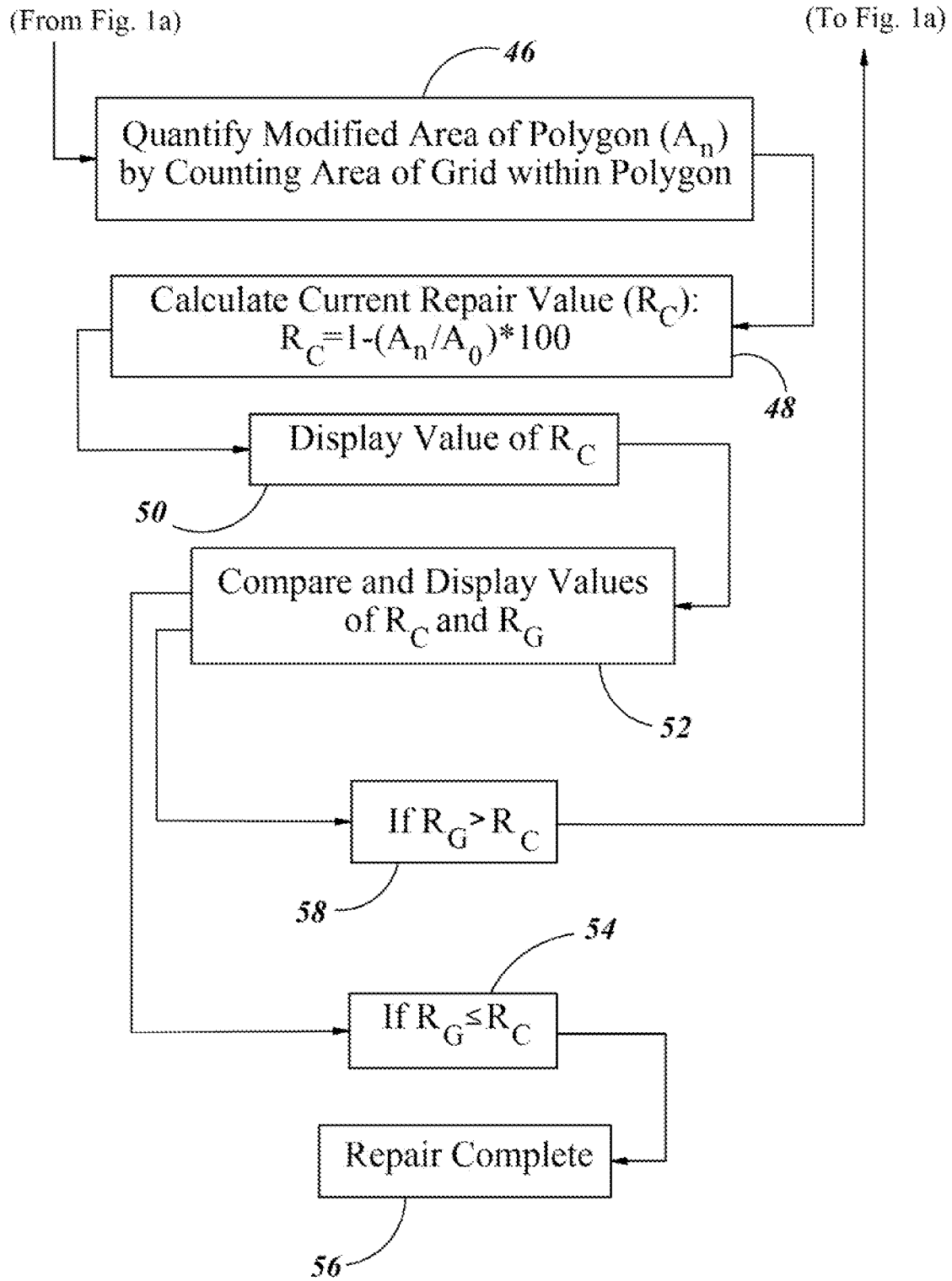

With reference to the illustrative drawings and particularly to FIGS. 1a and 1b, there is shown a flow chart which may illustrate the step-by-step operation of the software application which is subject of the current patent application. To use the application, the user would open the application 10 on a phone or other electronic device. The onscreen prompt may give the user a choice of a new project 12 or to continue with an existing project 14. If an existing project 14 is chosen, the application may prompt the user to decide if they are adding a new dent 15. If the new project 12 is chosen by the user, the application software may prompt the user to fill out some basic information 16 about the job, such as a vehicle description, a job number, the vehicle owner's information, VIN number or any other information. The application software may also be linked to other body shop software that may be utilized by the insurance company to track the costs and details of the repair. The user may also be prompted to set an acceptable repair goal ($R_G$). This may be a percentage value between 10% and 99%. This range is not critical, as it is likely a set level will be determined by the shop or the insurance company. This may be in the range of 80-90% but that is simply a feature of the software which allows the user to set their own level of the repair.

At this point the application may prompt the user to mark the dent 18. Marking the dent takes a certain degree of skill from a dent repair technician and may require the use of a PDR (Paintless Dent Repair) light. A PDR light (not shown) may be a directionally adjustable light that is commonly found in the industry. As will be discussed in more detail later, a dent may have two areas, the primary dent, and the secondary dent. If a rock is projected at a vehicle body, the immediate impact may be the primary dent. This will likely have a shape that is in some way representative of the object that caused the primary dent. The secondary dent may be caused by the force applied to the body by the rock that made the primary dent. In other words, the primary dent could be a one-inch diameter dent that is an inch deep but this may have caused a secondary dent that is ten inches in diameter and tapers from an undamaged area on the body down to a peripheral edge of the primary dent. The total damage may be any deformity that is altered from the original undamaged vehicle body. Therefore, the total area of the damage is the outer perimeter of the secondary dent, if there is one. If only a primary dent is found, then the outer edge of the primary dent is the damaged area. The technician, in accordance with the request by the application 18, may mark this outer edge of the damaged area. This can be done by use of a wet erase marker or any other removable marker that leaves a suitable temporary image on the vehicle body.

The application may then prompt the user to place a barcode decal 24 near the dent 20. The barcode decal 24 (FIG. 2) has two functions. The first is to provide a unique barcode 22 to enable documentation and tracking of the initial status of the dent and compare it to a partially or completely repaired version of the same dent later. The second function of the barcode decal 24 is the addition of a scale line 26, marked by the dimension "x" on the barcode decal 24. This scale line 26 provides a dimensional reference such that regardless of the size of the dent that appears in any photos, the set scale may be maintained throughout the entire repair process.

Referring to FIGS. 1a and 1b, the application may open the camera feature 28 on the electronic device and take a photo 30 of the damaged area, including the barcode decal 24 with the scale line 26. If the area is too large to provide adequate resolution to read the barcode 22, the application may alert the user to make one photo of the barcode decal 24 and then a second photo of the entire dent, including the barcode. The application may link the images together in the same file and may still use the scale line 26 to determine scale 32. The barcode is then scanned 29, which may identify that specific dent in that project 34 and save that information to that job 36.

To compare two things, there must be a way to quantify what it is you are looking at. This may mean applying a number that is representative to the current state of damage. This may be accomplished by the step of laying an electronic grid to cover the inside dimension of the closed polygon 38. The scale of the electronic grid may be determined by the scale line 26 on the barcode decal 24. This ensures a consistent grid is placed on the dent regardless of the size of the dent relative to that photo.

The damaged area may be quantified by counting the area of the grid within the closed polygon. The first time may identify the initial area ($A_0$) 40. Then the application my prompt the user to repair the dent 42. When the user feels the dent has gone through a significant repair, the user may remark the dent 44, and then access the application, opening on the existing project 14 where the barcode may identify that specific dent. A new photo may be taken 30, and the process may be repeated.

Every time after the area is partially repaired and remarked, the modified area of the polygon ($A_N$) 46 may be determined. This modified area ($A_N$) may be used to calculate the status of the repair process, and therefore the current repair value ($R_C$). This step may be calculated from the formula:

$$R_C = 1 - (A_N/A_0) * 100$$

where $A_N/A_0$ is the ratio of the modified current area to the initial area 48. Subtracting this from the number 1 and multiplying by 100 gives a percentage of repair based on the initial area. For example, if the initial area ($A_0$) was 100 units and the current repaired area ($A_N$) is 75 units, the current repair value ($R_C$), expressed as a percentage, would be 25%:

$$25 = 1 - (75/100) * 100$$

This current repair value ($R_C$) of 25% may be displayed on the screen of the electronic device in a step 50 to alert the user as to the status of the repair. In addition, the photographs taken at each stage of the repair process and the current repair value ($R_C$) may be saved to that file for future reference and documentation for the customer or the insurance company.

The application may then compare the values of the current repair value ($R_C$) to that of the acceptable repair goal ($R_G$) 52. If the current repair value ($R_C$) is greater than or equal to the acceptable repair goal ($R_G$) 54, the repair of that dent may be classified as complete 56. The user may be instructed to remove the barcode decal 24 from that dent and proceed to the next dent. If the current repair value ($R_C$) is less than the value of the acceptable repair goal ($R_G$) 58, the user may be instructed to continue repairing the dent 42 and the process continues.

The elegance of this system is that the user may jump from one dent to another dent at any time, documenting each dent automatically by way of the bar code 22 on the bar code decal 24. The system automatically tracks the progress of each dent, and documents the progress for later review. The scale line 26 ensures that the scale of each photo is consistent with each other photo of that dent. By doing so, the area of the electronic grid, and therefore the measurement system used to quantify the area of the damage is consistent. The technician only needs to work on a dent that still has a barcode decal 24 next to that dent, until all the barcode decals have been removed, as per the instruction of the application.

Referring to FIG. 2, an example of an electronic device 60, such as a smart phone, with a screen 62 to provide user interface between the user and the camera and processor housed within the electronic device 60. The use of a smartphone as the electronic device 60 is not intended to be limiting. The electronic device 60 may be any portable computer with a processor and a camera, including a smartphone, tablet or even a laptop. The exact specifications of the electronic device 60 is not considered critical to the novelty of the invention.

An example of a portion of a vehicle body 64 is shown in FIGS. 3-4. FIG. 3 shows two dents. A first dent 66 and a second dent 68, each with a specific barcode decal 24 with a scale line 26 next to each dent. FIG. 3 shows a front view of the same portion of a vehicle body 64 illustrating more detail of the first dent 66 and the second dent 68. As previously discussed, a dent may have two areas, the primary dent 70, and the secondary dent 72. If an object is projected at the vehicle body 64, the immediate impact may be the primary dent 70. This will likely have a shape that is in some way representative of the object that caused the primary dent 70. The secondary dent 72 may be caused by the force applied to the vehicle body 64 by the object that caused the primary dent 70. In other words, the primary dent 70 could be a one-inch diameter dent that is half of an inch deep but this may have caused a secondary dent 72 that is several inches in diameter and tapers from an undamaged area on the vehicle body 64 down to a peripheral edge of the primary dent 70.

In this illustration, the first dent 66 may include a primary dent 70, which may define a smaller radius. This primary dent 70 may transition into the secondary dent 72, which may be a larger and more gradual shape that may taper back to the original shape of the vehicle body 64. The second dent 68, may be a primary dent 70 only, with little or no element of a secondary dent 72. It is understood that if a spherical object caused a primary dent 70, the primary dent 70 may or may not have a spherical shape. Any secondary dent 72 resulting from the force applied to the vehicle body 64 when the primary dent 70 was made, could follow any number of unusual shapes, in that vehicle bodies are typically not of a single plane. Creases, bends and edges in sheet metal alter the section modulus of vehicle body 64, thus making some areas easier to deform than another adjacent area of the same vehicle body 64. These dents (66 & 68) are shown here to be relatively concentric, though on a typical vehicle body 64, especially the outside edge of the secondary dent 72, may be a seemingly odd shaped polygon. The complexity of that shape may make quantifying the area of the polygon difficult without the steps provided in the present invention, thus the present invention solves this problem.

Figure 5:
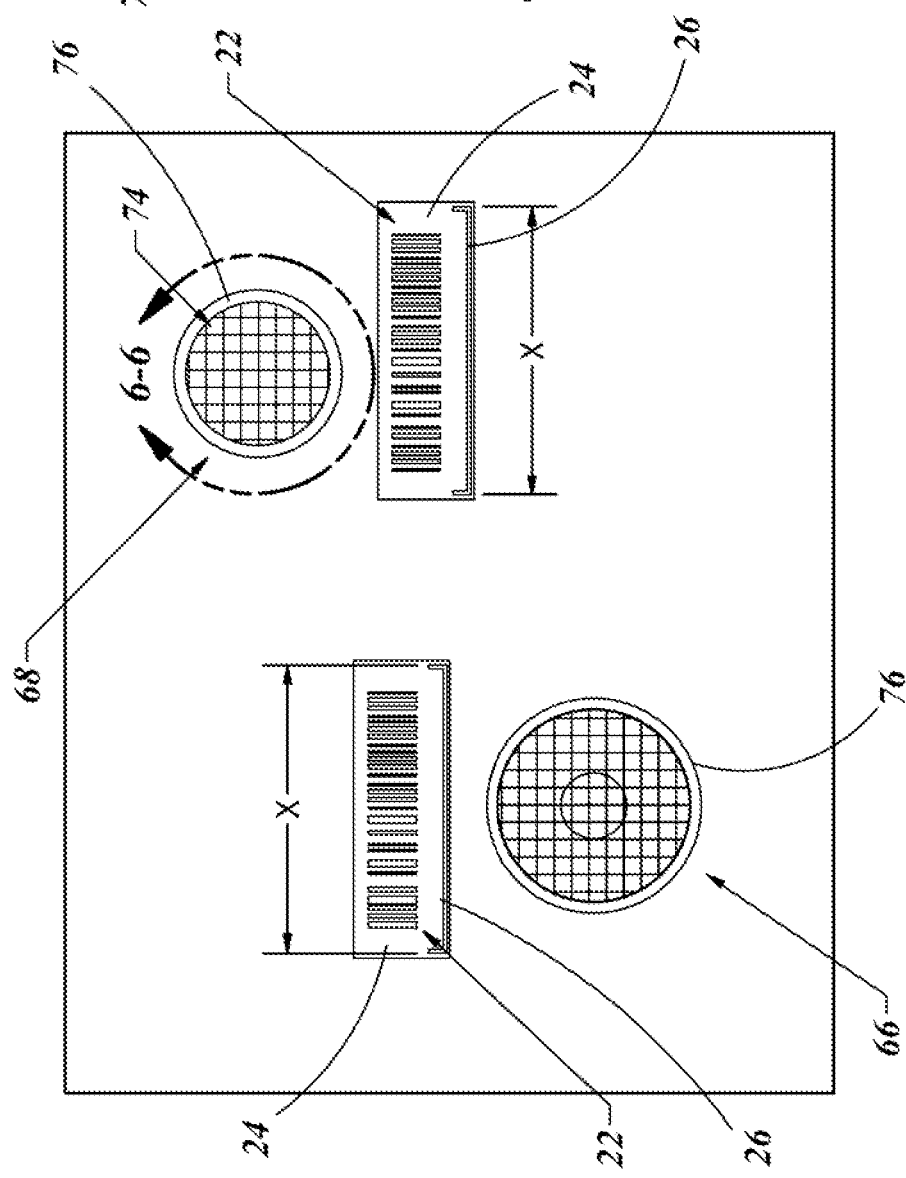
FIG. 5 is an example an image of the section of the vehicle body as presented in FIG. 3 presented with a digitized grid pattern on each dent.

FIG. 5 shows a plan view of the portion of the vehicle body 64 as presented in FIG. 2. The barcode decals 24 are located next to each of the first dent 66 and the second dent 68. As noted, the bar codes 22 may be unique to each bar code decal 24, so that each dent is specifically identified by that specific bar code 22. The scale line 26 on each bar code decal 24 may be consistent for that bar code decal 24. In this way, the scale line 26 may provide a scale for the scaled electronic grid pattern 74 that is bounded by the marked outline 76, which may be the closed polygon as previously described. The marked outline 76 may be the mark the technician applies to the outer area of the damage to the vehicle body 64. What is shown in FIG. 5 may be an image of that portion of the vehicle body 64, in this case showing both the first dent 66 and the second dent 68, as these dents are close enough in proximity to each other that both dents could be documented concurrently. Each dent may still be independently evaluated as a single dent, and identified by their specific bar code 22.

Figure 6:
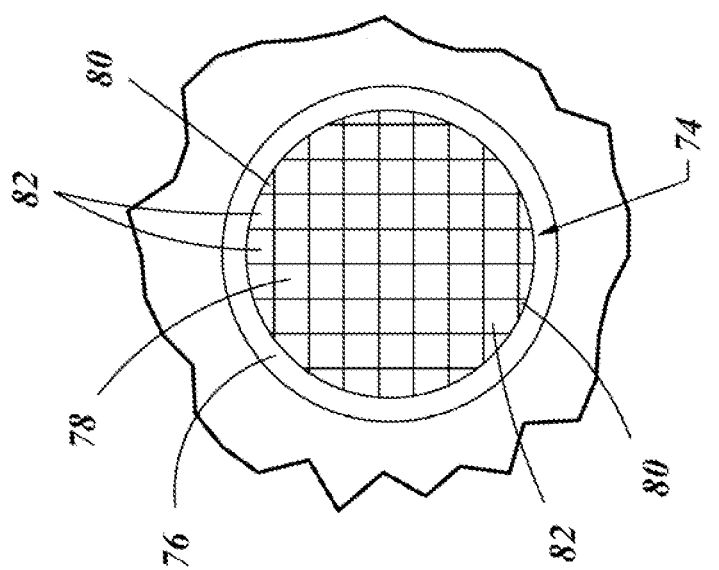
FIG. 6 is a detail view of one of the dents in FIG. 5 and noted by line 6-6, the detail more clearly illustrating the grid pattern.

A detail of the second dent 68 is shown in FIG. 6. Here the scaled electronic grid 74 may be more easily illustrated as bounded by the marked outline 76. The basis for the "scale" of the scaled electronic grid 74 may be based on the length of the scale line 26. For example, if the length of the scale line 26 is one inch, and the scaled electronic grid 74 is desired to have 0.10-inch squares, then the electronic grid 74 will be scaled and placed on that photo with a grid pattern that has ten grid squares over the distance of the full length of the scale line 26. These numbers are simply an example. The optimal grid pattern size can be set according to the size of the image and the power of the processor. This is important in that the next step is to count the grid squares 78 bounded by the marked outline 76 to determine the area of the damage on the vehicle body 64.

To do this, full grid squares 78 may be counted as "one" grid square. This is fine for most of the scaled electronic grid pattern 74, but on the outer edges, may times a full grid square 78 is not found. There may be partial grid squares on the edges. We may not want to count a partial value of a partial grid square. For example, if 30% of a grid square is visible, as in a small partial square 80, this grid square may be ignored. If 70% of a grid square is visible, as in a large partial square 82, that may be counted as a full grid square 78. The cutoff may be 50%, meaning that any partial grid square that has at least 50% of the area of a full grid square 78 showing, those may be counted as full grid squares 78. Those with less than 50% of the area of a full grid square 78 showing, may be ignored, and not counted in the total value of grid squares 78.

Determining the area of each partial grid square may be accomplished by counting the number of pixels in a full grid square 78 and using 50% of that as a criteria for determining a small partial square 80 or a large partial square 82. The size of a pixel may be determined by the resolution setting of the photograph. Since the user can zoom in or out on any photo, the number of pixels per the scale line 26 could change. This limitation from photo to photo suggests the need for the scaled electronic grid pattern 74, which is consistent from one photo to the next regardless of the zoom of the photo. Counting pixels in any one photo to distinguish between a small partial square 80 and a large partial square 82 needs only be consistent within that photograph.

Once the total number of grid squares 78 are counted, that number may be saved as the initial area ($A_O$) for the first time and as the current area ($A_N$) for each subsequent evaluation. Each current area ($A_N$) may be saved with the relevant photos along the repair, thus documenting the repair process. The most current value of the current area ($A_N$) will be used to determine the current repair value ($R_C$), as detailed above.

What is shown in FIGS. 7-8 are the plan view and the front view of the vehicle body 64 after undergoing a partial repair process. It may be noticed that the size of the first dent 66 and the second dent 68 are smaller than that illustrated in FIGS. 3-4 respectively. In addition, the depth (D) of the first dent 66 has also been reduced from that as shown in FIG. 3, and the same for the depth (d) of the second dent 68 relative to FIG. 4. The detail of the second dent 68, as shown in FIG. 9, has also been reduced and quantified by a smaller number of grid squares 78 bounded by the new marked outline 76. This reduction in the number of grid squares 78 results in a smaller current area ($A_N$), which would provide a larger current repair value ($R_C$). As noted, when the current repair value ($R_C$) reaches or surpasses the repair goal ($R_G$), the application software may display on the screen 62 of the electronic device 60 that the repair of that dent has been completed. The user may also be instructed to remove that barcode decal 24 as an acknowledgement that this dent is now complete.

As is illustrated, as the current area ($A_N$) gets smaller, the volume of the dent (66 & 68) is also reduced. In some cases, expensive scanners may be used to measure the volume of the dent (66 & 68). This volume may be representative of the amount of labor needed to repair the dent (66 & 68) and therefore provide a basis for a repair estimate. Not only are scanners expensive, the process of measuring the volume of a dent requires a baseline for comparison. As noted, vehicle bodies are seldom flat. So, a pre-damaged model must be provided to compare the 3-D model generated of the damaged area from the scan. This three-dimensional process may require extensive processing power to find the volume difference between the baseline (undamaged) and damaged model resulting from the scan. The present invention simplifies this process by using a two-dimensional image, which may be taken by a smartphone, that the technician likely already owns. The two-dimensional area values ($A_N$) from the photo image have been found to correlate extremely well with a three-dimensional volume values of most vehicle body dents in the field.

In other words, if the current area value ($A_N$) was reduced by 50% from the initial area value ($A_O$) during a repair process, the volume of the dent as determined by a 3-D scanner and applicable modeling software, was also found to be reduced by approximately 50%. Therefore, the greatly simplified, and more cost effective, system of the present invention may provide a similar ability to quantify the extent of damage of a vehicle body.

The system of the present invention does not need additional expensive equipment, such as a 3-D scanner, nor does it need a baseline (pre-damaged) 3-D model for comparison. This results in significantly lower processing power, which in the present invention, may be sufficient to be performed on the hand-held electronic device 60 as opposed to an external computer or a cloud-based system. This may result in faster results and more efficient use of the technician's time. Also, using the system of the current invention may be just as effective at predicting the cost of a repair and evaluating the level of repair compared to an expensive three-dimensional evaluation system.

The foregoing detailed description of the present invention is provided for purpose of illustration, and it is not intended to be exhaustive or to limit the invention to the embodiments shown. The embodiments may provide different capabilities and benefits, depending on the configuration used to implement key features of the invention.

What is claimed is:

1. A method comprising:
   providing an electronic device which includes a camera and a processor; and
   providing a software application operating on the processor and incorporating an image provided by the camera, the software application including the steps of:
   prompting a user to mark an outside edge of a damaged area on a vehicle body, thereby creating a closed polygon of the damaged area;
   prompting the user to place a unique barcode decal with a scaling line adjacent to the damaged area in the vehicle body;
   opening the camera feature on the electronic device and prompting the user to take an image of the damaged area including the unique barcode decal;
   creating a file unique to the barcode of the unique barcode decal;
   scaling the image based on the scaling line on the unique barcode decal;
   laying an electronic scaled grid over the damaged area as defined by the closed polygon; and
   quantifying sum of an area of the closed polygon by summing the grid squares provided by the electronic scaled grid.

2. The method of claim 1, wherein an initial area is the initial value obtained by summing the grid squares provided by the electronic scaled grid within the closed polygon.

3. The method of claim 2, wherein every subsequent value obtained by summing the grid squares provided by the electronic scaled grid within the closed polygon is a modified area.

4. The method of claim 3, wherein a current repair value is one minus a ratio of the modified area divided by the initial area, multiplied by one hundred.

5. The method of claim 4, further comprising:
   comparing the current repair value to an acceptable repair goal.

6. The method of claim 5, wherein if the current repair value is greater than or equal to the acceptable repair goal, the repair is complete.

7. The method of claim 5, wherein if the current repair value is less than the acceptable repair goal, the process is continued.

8. The method of claim 1, wherein the scaling line on the unique barcode decal is consistent in length for each unique barcode decal, thus providing a baseline scale for each image to enable consistent scaling of each image.

9. The method of claim 1, wherein the barcode on the barcode decal is unique, thereby identifying each specific dent as the damaged area changes.

10. The method of claim 1, wherein the step of quantifying the area of the closed polygon, includes the step of:
    counting all complete grid squares that fall within, and as defined by, the electronic scaled grid over the damaged area as defined by the closed polygon; and
    evaluating all partial grid squares in which only a portion of that grid square lies within the closed polygon, whereby when 50% or more of the full grid square lies within the closed polygon that partial grid square is counted as a full grid square, and when the portion of the grid square that lies within the closed polygon is less than 50% of a full grid square, that grid square is not counted.

* * * * *